(12) United States Patent
Oelcer et al.

(10) Patent No.: US 6,985,536 B2
(45) Date of Patent: Jan. 10, 2006

(54) BLOCK CODING FOR MULTILEVEL DATA COMMUNICATION

(75) Inventors: Sedat Oelcer, Au (CH); Evangelos S. Eleftheriou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/045,810

(22) Filed: Jan. 11, 2002

(65) Prior Publication Data

US 2002/0136317 A1  Sep. 26, 2002

(30) Foreign Application Priority Data

Jan. 12, 2001  (EP)  .................................. 01100449

(51) Int. Cl.
*H04L 23/02*  (2006.01)
*H04L 5/12*  (2006.01)

(52) U.S. Cl. ...................... 375/261; 375/260; 375/259; 370/20

(58) Field of Classification Search ................ 332/144; 370/215; 375/259, 260, 261, 298, 316; 455/110
See application file for complete search history.

(56) References Cited

U.S. PATENT DOCUMENTS 6,023,783 A * 2/2000 Divsalar et al. ............ 714/792
6,115,427 A * 9/2000 Calderbank et al. ........ 375/267
6,643,332 B1 * 11/2003 Morelos-Zaragoza et al. ... 375/265

OTHER PUBLICATIONS

Gottfried Ungerboeck, Channel Coding with Multilevel/Phase Signals, IEEE Transactions on Information Theory, vol. IT-28, No.1, Jan. 1982, pp. 55-66.*
Jared L. Zerbe et. al, 1.6 Gb/s/pin 4-PAM Signaling and Circuits for a Multidrop Bus, IEEE Journal of Solid-State Circuits, vol. 36, No. 5, May 2001, pp. 752-760.*
"Reduced Complexity Iterative Decoding of Low-Density Parity Check Codes Based on Belief Propagation", Marc P.C. Fossorier, Miodrag Mihaljevic, Hideki Imai.
"Irregular Repeat-Accumulate Codes": Hui Jin, Aamod Khandekar, and robert McEliece; Dept. of Electrical Eng., California Institute of Technology.
"Reed-Muller Coding for Partial Response Channels", Sedat Olcer and Gottfried Ungerboeck; IBM research Div., Zurich Research Lab. Switzerland.
"Bandwidth Efficient Low Density Parity Check Coding using Multi Level Coding and Iterative Multi Stage Decoding", K.R. Narayanan and J. Li; Texas A&M University, College Sta. Texas.

(Continued)

*Primary Examiner*—Stephen Chin
*Assistant Examiner*—Erin M. File
(74) *Attorney, Agent, or Firm*—Louis P. Herzberg

(57) ABSTRACT

Methods, apparatus and systems for multilevel data communication comprises dividing a set of information bits to be transmitted into a first group and a second group; encoding the first group to generate a block code, selecting a subset of symbols in a constellation of symbols in dependence on the block code according to a Gray-coded mapping function, selecting a symbol within the subset in dependence on the second group according to a Gray-coded mapping function, and transmitting the selected symbol.

16 Claims, 3 Drawing Sheets

OTHER PUBLICATIONS

Catena Networks, Inc., "A Turbo TCM scheme with Low Decoding Complexity" Bangalore, India, Study group.

Mitsubishi Elec. Corp.: Proposal of Dicision making process for Turbo Coding & report of performance evaluation of proposed TTCM(PCC)with R-S code and without R-S code.

VOCAL Technologies Ltd., Results of requirements requested in the Coding Ad hoc report(BA-108R1)for the proposed Turbo Codes for ADSL modems by VoCAL Technologies Ltd. in BA-020R1.

Globespan: Block Product Turbo Codes for G.dmt.bis and G.lite.bis.

Aware, Inc. Low Density Parity Check Coded Modulation for ADSL.

* cited by examiner

BLOCK CODING FOR MULTILEVEL DATA COMMUNICATION

FIELD OF THE INVENTION

The present invention relates to block coding methods and apparatus for multilevel data communication.

BACKGROUND OF THE INVENTION

In many communication systems, including both wired and wireless transmission systems, there are strict limitations on transmit signal bandwidth. Such limitations impose a demand for signal modulation with a number of levels greater than two. Many conventional systems employ Trellis-coded modulation (TCM) in such applications.

There is a growing demand for communication systems, including both wired and emerging wireless transmission systems, that require modulation to be accomplished with a number of levels greater than two, mainly due to strict limitations on transmit signal bandwidth. Trellis-coded modulation (TCM) is an example of a conventional modulation scheme for such applications. However, a problem associated with TCM is that it is unsuitable for iterative decoding. Therefore, further improvements in signal quality at an acceptable complexity are difficult to achieve.

"A turbo TCM scheme with low decoding complexity," Catena Netwoks Inc., Temporary Document BI-090, ITU-T Study Group 15, Question 4, Goa, India, 23–27 Oct. 2000, "Proposal of decision making for turbo coding and report of performance evaluation of proposed TTCM(PCCC) with R-S code and without R-S code," Mitsubishi Electric Corp., Temporary Document BI-003, ITU-T Study Group 15, Goa, India. 23–27 Oct. 2000, and "Results of the requirements requested in the coding ad hoc report," Vocal Technologies Inc., Temporary Document HC-073, ITU-T Study Group 15, Question 4, Huntsville, Canada, Jul. 31–Aug. 4 2000, describe turbo-coding schemes for multilevel ADSL and VDSL transmission. These turbo-coding techniques involve encoding of the information bits by parallel concatenation of convolutional encoders in recursive systematic form and iterative decoding by one of several possible turbo-decoding techniques. "Block product turbo codes for G.dmt.bis and G.lite.bis." Globespan Inc., Temporary Document BA-063, ITU-T Study Group 15, Question 4, Antwerp, Belgium, Jun. 19–23, 2000 describes the application of block product codes using component Bose-Chaudhuri-Hoequenghem (BCH) codes and their soft iterative decoding based on the Chase algorithm. These techniques offer some performance enhancements over Trellis coding at the expense of incurring additional complexity.

Another coding technique uses Low Density Parity Check (LDPC) block codes. As indicated in R. G. Gallager. "Low-density parity-check codes," *IRE Trans. Info. Theory*, vol. IT-8, pp. Jan. 21–28, 1962, D. J. C. MacKay and R. M. Neal, "Near Shannon limit performance of low density parity check codes, *Electron. Lett.*, vol. 32, no. 18, pp. 1645–1646, August 1996, D. J. C. MacKay, "Good error-correcting codes based on very sparse matrices," *IEEE Trans. on Inform. Theory*. vol. 45, No. 2, pp. 399–431, March 1999, and FOSSORIER, M. P. C. , MIHALJEVIC, M. , and IMAI. H.: "Reduced complexity iterative decoding of low density parity check codes based on belief propagation", IEEE Trans. Commun., 1999, 47, (5), pp. 673–680 , coded modulation using LDPC codes has to date focussed on applications requiring binary modulation such as wireless systems or digital magnetic recording.

K. R. Narayanan and J. Li, "Bandwidth efficient low density parity check coding using multilevel coding and interative multistage decoding," Proc. Int. Symp. on Turbo-Codes, Brest, France, pp. 165–168, September 2000 describes a multilevel coding technique based on binary LDPC block codes. This technique uses LDPC block codes for bit-interleaved modulation or for multilevel coding with iterative multi-stage decoding. For bit-interleaved LDPC modulation according to this technique, all the bits used to select a multilevel symbol are LDPC code bits. For multilevel coding, several LDPC block codes are used as component codes in a multilevel scheme. This technique has the drawback of requiring more than one LDPC encoder/decoder, leading to substantial implementation complexity especially for long codes and/or large constellation sizes.

"Low density parity check coded modulation for ADSL," Aware Inc. Temporary Document BI-081. ITU-T Study Group 15, Question 4, Goa, India, Oct. 23–27, 2000 also describes a multilevel coding technique based on binary LDPC block codes. This technique is similar to TCM, except that LDPC coding is employed instead of convolutional coding. In particular, set partitioning follows the same principle as that used in TCM. This technique has the drawback of requiring an additional Bose-Chaudhuri-Hoeguenghem (BCH) code which adds to system complexity. Also, set partitioning, as required in TCM and similar schemes, leads to poor performance for soft-decision based decoding techniques.

SUMMARY OF THE INVENTION

In accordance with the present invention, there is now provided a method for multilevel data communication comprising: dividing a set of information bits to be transmitted into a first group and a second group; encoding the first group to generate a block code; selecting a subset of symbols in a constellation of symbols in dependence on the block code according to a Gray-coded mapping function; selecting a symbol within the subset in dependence on the second group according to a Gray-coded mapping function; and, transmitting the selected symbol.

Example embodiments of the present invention further comprise receiving the selected symbol and recovering the set of information bits from the selected symbol. The recovering of the set of information bits may comprise soft demapping the received symbol to generate a probability for each of the bits represented in the symbol to have a particular value and decoding the received symbol to recover the set of information bits in dependence on the probabilities generated by the soft demapping and the received symbol.

Viewing the present invention from another aspect, there is now provided apparatus for multilevel data communication, the apparatus comprising: a divider for dividing a set of information bits to be transmitted into a first group and a second group; a block encoder connected to the divider for encoding the first group to generate a block code; and, a symbol mapper connected to the divider and the block encoder for selecting a subset of symbols in a constellation of symbols in dependence on the block code according to a Gray-coded mapping function, selecting a symbol within the subset in dependence on the second group according to a Gray-coded mapping function, and transmitting the selected symbol.

Further embodiments of the present invention comprise a receiver for receiving the selected symbol and recovering the set of information bits from the selected symbol. The receiver may comprise: a soft demapper for demapping the received symbol to generate a probability for each of the bits represented in the symbol to have a particular value and a decoder for decoding the received symbol to recover the set of information bits in dependence on the probabilities generated by the soft demapping and the received symbol.

The present invention also extends to a communications device comprising an information source for generating a set of information bits and apparatus for multilevel data transmission as herein before described connected to the information source for transmitting the set of the information bits.

The first group may comprise least significant bits of the set of information bits and the second group comprises most significant bits of the set of information bits. Alternatively, the first group may comprise most significant bits of the set of information bits and the second group comprises least significant bits of the set of information bits.

The present invention advantageously offers superior performance in terms of achievable coding gains. This is because, block coding schemes can be decoded iteratively, thereby leading to substantial performance gains as compared to trellis-coded modulation. Particularly advantageous embodiments of the present invention comprise multilevel encoding schemes based on LDPC codes or simple product codes that do not need interleaving and that can be decoded via the simple sum-product algorithm (SPA) or low-complexity derivatives thereof. LDPC codes provide an increase the Signal to Noise Ratio (SNR) gains. Turbo codes may also be employed. In general, turbo codes are decoded in an iterative fashion utilizing a complex soft-input soft-output Bahl-Cocke-Jellinek-Raviv (BCJR) algorithm or sub optimal versions thereof. However, in comparison with turbo codes, LDPC codes exhibit asymptotically a superior performance without suffering from "error floors" and admit a wide range of tradeoffs between performance and decoding complexity. Therefore, LDPC codes are preferred. However, it will be appreciated that the present invention is equally applicable to other classes of block codes, such as product codes and repeat-accumulate codes.

Multilevel modulation using LDPC codes can be addressed either by use of binary LDPC codes or by use of non binary LDPC codes. However, the latter approach requires higher implementation complexity than the former. Particularly advantageous embodiments of the present invention to be described shortly, implement coded multilevel modulation based on binary LDPC codes.

Viewing the present invention from yet another aspect there is provided a multilevel coding scheme for block codes that uses a combination of block-encoded bits and uncoded bits in selecting multilevel symbols. The advantage of allowing for uncoded bits in the mapping function is increased flexibility, particularly in selecting the size of the Quadrature Amplitude Modulation (QAM) symbol constellations. Another advantage is additional performance gain due to high spectral efficiency. Irrespective of the block code employed, encoding the 4 LSBs of the transmitted 2D symbols is sufficient to achieve acceptable performance for all constellations of size greater than 16.

In an especially particular embodiment of the present invention, there is provided a carrier transmission method comprising partially block-coded multilevel transmission and iterative decoding. The method is applicable to both single carrier and multicarrier systems. Because, in accordance with the present invention, interleaving can be avoided, the present invention is particularly applicable to systems requiring low encoding latency.

DESCRIPTION OF THE DRAWINGS

Embodiments of the present invention will now be described, by way of example only, with reference to the accompanying drawings, in which.

DESCRIPTION OF THE INVENTION

Figure 1:
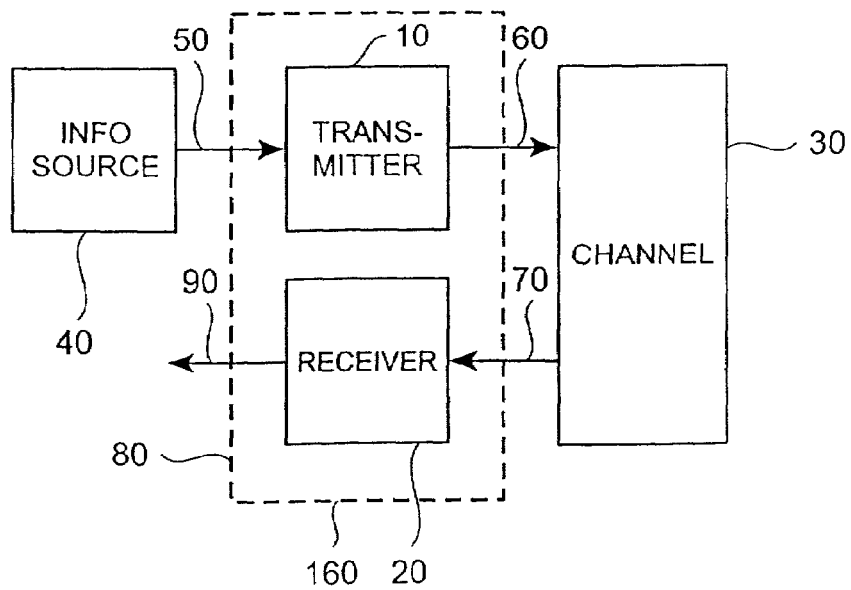
FIG. 1 is a block diagram of a communication system embodying the present invention.

Referring first to FIG. 1, an advantageous embodiment of the present invention comprises a transmitter 10 connected to a receiver 20 via a communication channel 30. In operation, the transmitter 10 receives a sequence of information bits 50 from an information source 40. The transmitter converts the information bits 50 into multilevel symbols 60 for transmission to the receiver via the communication channel 30. The multilevel symbols 60 are of a complex form having a real part and an imaginary part. The communication channel 30 introduces noise to the multilevel symbols 100 to produce a flow of noisy multilevel symbols 70 into the receiver 20. The receiver then serially recovers the information bits from the received symbols 70. The recovered information bits 90 are then supplied to a recipient system (not shown).

Figure 2:
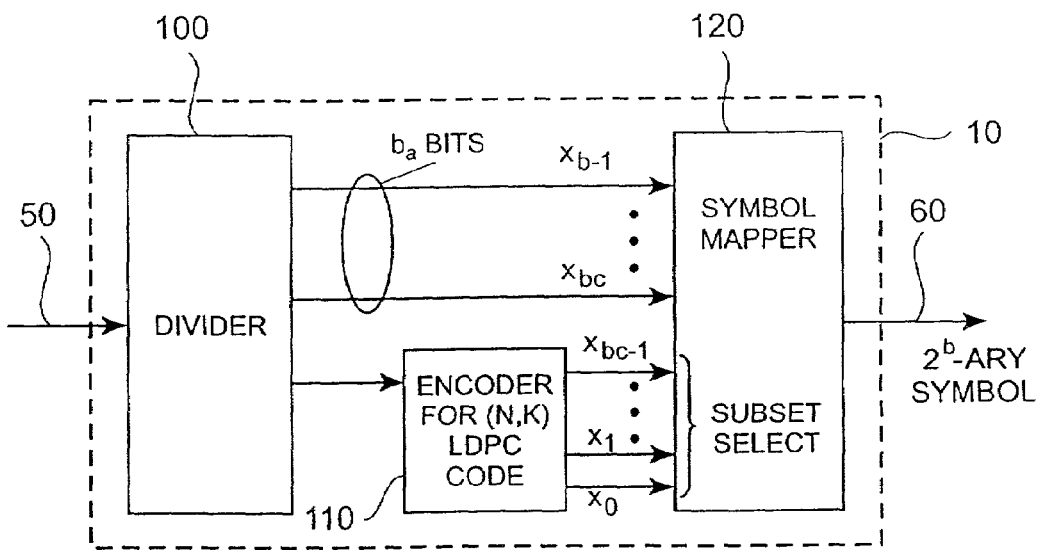
FIG. 2 is a block diagram of a transmitter of the communication system.

Referring now to FIG. 2, the transmitter 10 comprises a divider 100, a block encoder 110 and a symbol mapper 120. In operation, at each modulation instant, the divider 100 divides a set of information 50 bits from the information source 40 to be communicated to the receiver 20 into a first group and a second group. The block encoder 110 encodes the first group to generate a block code. The symbol mapper 120 connected to the divider and the block encoder for selecting a subset of symbols in a constellation of symbols in dependence on the block code according to a Gray-coded mapping function and for selecting a symbol within the subset in dependence on the second group according to a Gray-coded mapping function. Multilevel symbols 60 thus generated by the symbol mapper 120 are communicated to the receiver 20 via the communication channel 30. The divider 100 may implemented by a shift register or similar logical function.

Figure 3:
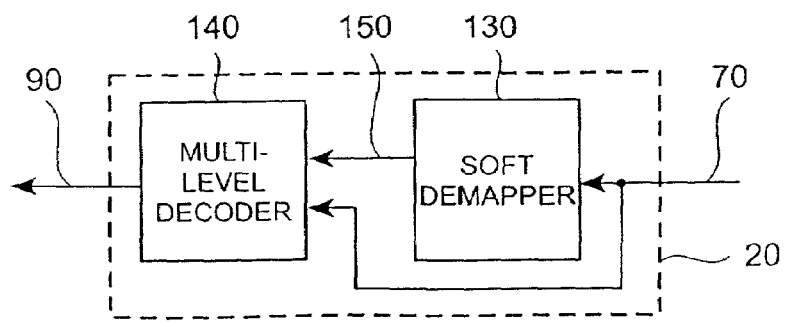
FIG. 3 is a block diagram of a receiver of the communication system.

With reference to FIG. 3, the receiver 20 comprises a multilevel decoder 140 and a soft demapper 130. In operation, the noisy multilevel symbols 70 are soft demapping by the soft demapper 130 to provide soft information on individual code bits in the form of a posteriori probabilities 150. The probabilities 150 are employed at the multilevel decoder 140 to carry out an LDPC decoding procedure comprising a Sum-Product Algorithm (SPA) for recovering the information bits from the received symbols 70. The recovered information bits 90 are then supplied to a recipient system.

Referring back to FIG. 1, it will be appreciated that the transmitter 10 and receiver 20 may be implemented by hardwired logic, by a general purpose processor or dedicated digital signal processor programmed with computer program code, or by hardwired logic and computer program code in combination. In will also be appreciated that the functions of transmitter 10 and receiver 20 may be integrated in a unitary device 160 such as an application specific integrated circuit (ASIC) transceiver device.

When the symbol constellation employed in the symbol mapper 120 is a square QAM constellation (i.e., wherein b defined below is even), and provided tat the in-phase and quadrature components of the noise at the input of the soft demapper 130 are independent, soft demapping can be achieved independently for the real and imaginary parts of the complex symbols received. The computational complexity of soft demapping is substantially reduced in comparison with joint demapping of real and imaginary signals jointly. Square QAM constellations will therefore be considered for the purposes of this explanation. However, extensions to cover other types and shapes of constellations can easily be derived. It will thus suffice to describe multilevel LDPC encoding and decoding for L-ary PAM (L=$2^b$) with the symbol alphabet $$\text{Å}=\{A_0=-(L-1), A_1=-(L-3), \ldots, A_{L/2-1}=+1, \ldots, A_{L-1}=+(L-1)\}. \quad (1)$$

Each symbol in the set Å is labeled with a binary b-tuple $(x_{b-1}, x_{b-2}, \ldots, x_1, x_0)$. The $b_c$ least significant bits (LSBs) $(x_{b_c-1}, x_{b_c-2}, \ldots, x_1, x_0)$ label subsets of the set Å. The subsets $\text{Å}_{l,i=}0,1,\ldots,2^{b_c}-1$ are obtained by partitioning Å so as to maximize the minimum Euclidean distance between the symbols within each subset. The $b_u$=b-$b_c$ most significant bits (MSBs)$(x_{b-1}, x_{b-2}, \ldots, x_{b-b_u+1}, X_{b-b_u})$ label the symbols within a subset. Furthermore, the $b_c$ LSBs and $b_u$ MSBs each follow a Gray coding rule. Table 1 below gives an example of symbol labeling and mapping for the case L=16. Note that the symbol mapping obtained by this approach is different from the one used in conventional trellis-coded modulation. A description of conventional trellis-coded modulation is provided in G. Ungerboeck. "Channel coding with multilevel/phase signals." IEEE Trans. on Information Theory, Vol. IT-28, No. 1, pp. 55–67, January 1982.

TABLE 1

Example of symbol labeling for the case L = 16, with $b_u$ = 2 and $b_c$= 2.

| L-ary symbol | $X_3$ | $X_2$ | $X_1$ | $X_0$ | Subset number |
|---|---|---|---|---|---|
| +15 | 0 | 0 | 0 | 0 | 0 |
| +13 | 0 | 0 | 0 | 1 | 1 |
| +11 | 0 | 0 | 1 | 1 | 2 |
| +9  | 0 | 0 | 1 | 0 | 3 |
| +7  | 0 | 1 | 0 | 0 | 0 |
| +5  | 0 | 1 | 0 | 1 | 1 |
| +3  | 0 | 1 | 1 | 1 | 2 |
| +1  | 0 | 1 | 1 | 0 | 3 |
| -1  | 1 | 1 | 0 | 0 | 0 |
| -3  | 1 | 1 | 0 | 1 | 1 |
| -5  | 1 | 1 | 1 | 1 | 2 |
| -7  | 1 | 1 | 1 | 0 | 3 |
| -9  | 1 | 0 | 0 | 0 | 0 |
| -11 | 1 | 0 | 0 | 1 | 1 |
| -13 | 1 | 0 | 1 | 1 | 2 |
| -15 | 1 | 0 | 1 | 0 | 3 |

With the above labeling, an L-ary symbol is used to convey $b_c$ LDPC code bits and $b_u$ uncoded information bits.

If coding is achieved with a binary (N,K) LDPC code with K being the information block length and N being the code length, then this mapping technique results in a spectral efficiency of $$\eta = \frac{K}{N}b_c + b_u \text{ bits/s/Hz} \quad (2)$$

Decoding of the LDPC-coded signals is achieved in two steps: in the first step, LDPC decoding is performed for the sequence of least significant $b_c$ bits and in the second step the sequence of $b_u$ uncoded bits is estimated.

Denoting by y the received real signal (corresponding, in general, to the real or imaginary part of the received complex signal):

$$y = A + n \quad (3)$$

With A $\in$ Å and n an AWGN sample with variance $\sigma_n^2$, the a posteriori probability (APP) that bit $x_\lambda, \lambda$=0, 1 . . . , $b_c$–1, is zero (alternately one) is computed as:

$$Pr(x_\lambda = 0|y) = \frac{\sum_j e^{-\frac{(y-A_j)^2}{2\sigma_n^2}}}{\sum_j^{L-1} e^{-\frac{(y-A_j)^2}{2\sigma_n^2}}}, \quad (4)$$

Where the summation in the numerator is taken over all symbols $A_j \in$ Å for which $x_\lambda$=0. Iterative LDPC decoding is achieved by the sum-product algorithm (SPA) using the above APPs.

In the second decoding step, the $b_u$ MSBs are estimated for each received signal by first determining a subset $\text{Å}_i$ based on the recovered LDPC code bits and then making a minimum Euclidean distance symbol-decision within this subset. This second decoding step therefore involves a relatively low implementation complexity.

To illustrate the performance that can be achieved with the multilevel modulation technique herein before described transmission is considered over an AWGN channel using 64-QAM and 4096-QAM. The results are presented in terms of symbol-error rate versus the normalized signal-to-noise ratio (SNR$_{norm}$) defined as $$SNR_{norm} = \frac{\eta}{2^\eta - 1}\frac{E_b}{N_o} \quad (5)$$

where $E_b/N_0$ is the ratio of energy-per-bit to noise-power-spectral-density. The (1998,1777) code used in the simulations is due to MacKay.

Figure 4:
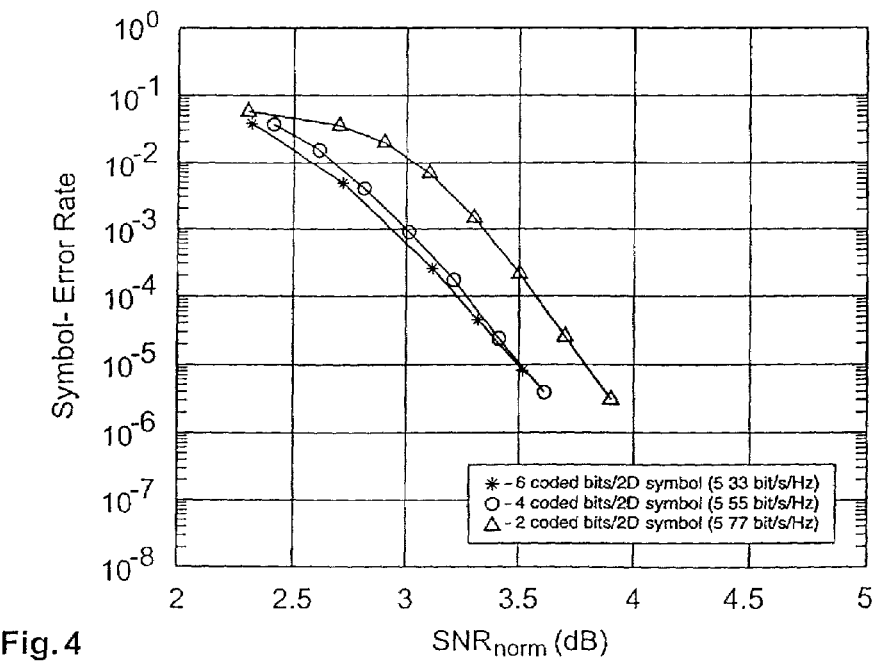
FIG. 4 is a graph of symbol-error probability versus $SNR_{norm}$ for a 64-QAM communication system embodying the present invention.

The graph of FIG. 4 is based on 64-QAM (b=3 along each dimension) and shows performance for the cases where $b_u$=0 (no uncoded bits), $b_u$=1 (2 uncoded bits per 2D symbol), and $b_u$=2 (4 uncoded bits per 2D symbol).

Figure 5:
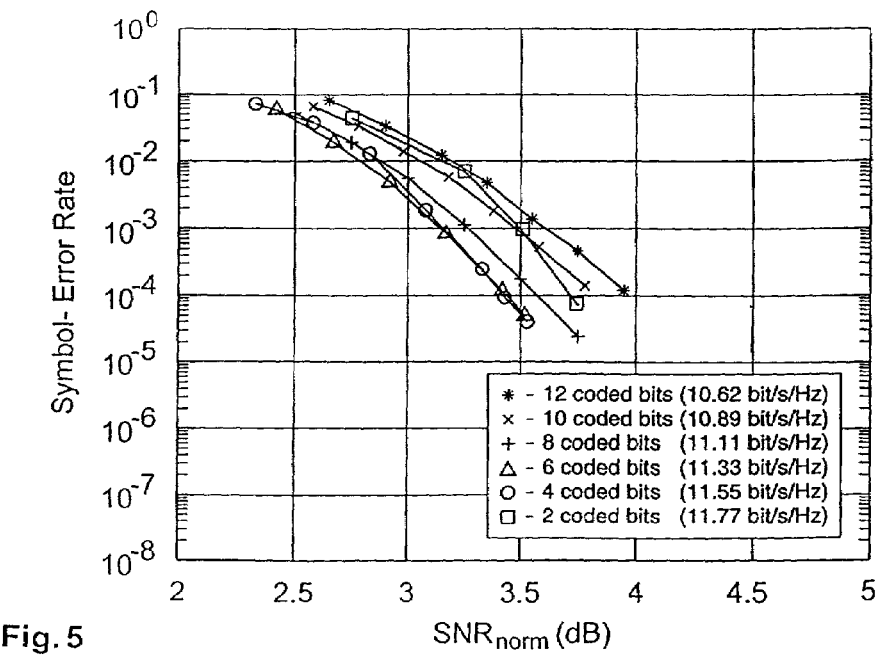
FIG. 5 is a graph of symbol-error probability versus $SNR_{norm}$ for a 4096-QAM communication system embodying the present invention; and, FIG. 6 is a graph demonstrating the performance of an example of an LLR-SPA for an additive white Gaussian noise channel.

FIG. 5 shows the effect of introducing uncoded bits for 4096-QAM (b=12 along each dimension) by plotting system performance with 0, 2, 4, 6, 8, and 10 uncoded bits per 2D symbol ($b_u$=0, 1, 2, 3, 4, and 5, respectively).

FIGS. 4 and 5 demonstrate that it is generally sufficient to encode two LSBs only to achieve acceptable performance.

Decoder complexity can be reduced in various ways. For example, not all the L terms need to be included in the sum appearing in the denominator of Equation (4): if for a received signal y the closest L'<L nominal levels are determined the summation can be modified to include these L' levels only. The resulting loss in performance is usually very small. A similar approach can be taken for the numerator term. Furthermore, messages passed between the nodes in the SPA need not be a posteriori probabilities but can be likelihood or log-likelihood ratios. Various simplifications of the SPA can be adopted for different implementations depending on specific applications.

The multilevel techniques herein before described are suitable for use in multicarrier modulation systems. Examples of such systems include discrete multitone modulation systems and filtered multitone modulation systems such as ADSL, ADSL lite and VDSL systems. In multicarrier modulation, as each carrier adapts the spectral efficiency of its transmission to the channel characteristics, the employed multilevel symbol constellation can vary from one carrier to the next. Coding is not performed separately for each subchannel but rather "across" subchannels. Therefore, the provision of uncoded bits allows multilevel coding to be achieved in a very flexible way because different constellation sizes can be accomodated efficiently.

The underlying error-correcting code need not be limited to LDPC codes. Other types of block codes can also be employed. For example, the family of repeat-accumulate codes described in D. Divsalar, H. Jin, and R. J. McEliece, "Coding theorems for 'turbo-like' codes," Proc. 36$^{th}$ Allerton Conf. on Communiations, Control, and Computing, Allerton, Ill., pp. 201–210, September 1998, and H. Jin, A. Khandekar, and R. McEliece, "Irregular Repeat-Accumulate Codes," Proc. Int. Symp. on Turbo-Codes, Brest, France. pp. 1–8, September 2000, which can be understood as a particular form of LDPC codes, can be also used. Similarly, array codes can be employed. When array codes are viewed as binary codes, their parity check matrices exhibit sparseness which can be exploited for decoding them as LDPC codes using the SPA or low complexity derivatives thereof. Array codes are described further in M. Blaum, P. Farrell, and H. van Tilborg, "Array codes", in Handbook of Coding Theory, V. S Pless and W. C. Huffman Eds., Elsevier 1998.

As mentioned earlier, LDPC codes can be decoded at the receiver 20 via the sum-product algorithm (SPA). The SPA is described in the aforementioned reference D. J. C. MacKay, "Good error-correcting codes based on very sparse matrices," IEEE Trans. on Inform. Theory vol. 45, No. 2, pp. 399–431, March 1999. The SPA operates on a bipartite graph associated with a given sparse parity check matrix H having M rows and N columns. This graph has two types of nodes: N symbol nodes corresponding to each bit in a code word $\bar{x}$, and M check nodes corresponding to the parity checks $\bar{pc}_m(x), 1 \leq m \leq M$, represented by the rows of the matrix H. Each symbol node is connected to the check nodes it participates in, and each check node is connected to the symbol nodes it checks. The SPA operates by passing messages between symbol nodes and check nodes. The messages themselves can be a posteroiri probabilities (APP) or log likelihood ratios (LLRs). Typical message parsing schedules alternately compute updates of all symbol nodes and of all check nodes.

The computational complexity of the SPA is governed by the check node updates. In the probability domain, such computation involves the summation of the product terms each involving a plurality of probabilities. In the log domain, the check node updates require computation of the inverse hyperbolic tangent of a product of hyperbolic tangent functions of LLRs. Mackay demonstrated via computational simulations that there is a loss in performance of approximately 0.2 dB associated with such conventional techniques. This performance loss can be substantial in terms of block and symbol error rates because of the steepness of the error curves of LDPC codes. An SPA having a substantially reduced complexity but without incurring a loss in performance would be clearly desirable.

In an advantageous embodiment of the present invention, an approximate check node update is based on a difference-metric approach on a two state trellis. This approach employs a dual max. approximation. The aforementioned Fossorier reference describes an example of a dual max. approximation. The approach can be thought of as similar to a Viterbi algorithm on a two state parity check trellis. The approach uses the difference of state metrics, i.e., the difference of logs, which is the LLR of the probabilities. The approach is recursive and requires one sign bit manipulation and one comparison at a time. This greatly simplifies computational implementation and facilitates parallel recursive operation in a general purpose Digital Signal Processor (DSP) environment, or in an application specific integrated circuit (ASIC) or similar custom logic design.

In a particular embodiment of the present invention, the performance of the algorithm is improved by introduction of a correction factor. The correction factor involves the addition of a constant at every recursive step. The added constant can be viewed as a fixed offset with the appropriate polarity. The addition does not significantly increase computational complexity. It is found that the correction factor bring the performance of the algorithm to within 0.05 dB of the performance of the full SPA.

In an advantageous embodiment of the present invention to be described shortly, there is provided a soft input/output detection method for decoding LDPC codes by exchanging reliability information between the soft demapper 130 and the multilevel decoder 140 in an iterative fashion. This decoding method advantageously delivers similar performance to that of full SPA, but with considerably reduced complexity. The encoded data is demapped into soft bits prior to LDPC decoding. LDPC codes can be decoded in an iterative fashion via a complex soft input/output algorithm in a manner which is computationally simpler than that conventionally employed for decoding turbo codes. Also, as mentioned earlier, LDPC codes exhibit asymptotically an excellent performance without "error floors". Further, LDPC codes offer a range of tradeoffs between performance and decoding complexity.

Following the notation employed in the aforementioned Mackay and Fossosier references, let $N(m)=\{n:H_{m,n}1\}$ be the set of bits that participate in check m, and let $M(n)=\{m: H_{m,n}=1\}$ be the set of checks in which bit n participates. The exclusion of an element n from N(m) or m from M(n) is denoted by N(m)\n or M(n)\m, respectively, and $H^T$ is the transpose of H. Finally, let $y=[Y_1, \ldots, Y_N]$ be the received sequence that corresponds to the transmitted codeword $x=[x_1, \ldots, x_N]$. The inputs of the SPA consist of LLRs ln $(P(x_n=1|y_n)/P(x_n=0|y_n))$ or, equivalently, of APPs $P(x_n=1|y_n)$ and $P(x_n=0|y_n)$, which are determined by the channel statistics. Operation of the SPA then proceeds in the following steps:

Initialization: $q_{m,n}(x) = P(x_{n=x|y_n})$ for x=0, 1.

Step 1 (check-node update): For each m and n ∈ N(m), and for x=0, 1, compute $$r_{m,n}(x) = \sum_{\{x_{n'}:n' \in N(m)\backslash n\}} P(pc_m(x) = 0 \mid x_n = x, \{x_{n'}:n' \in N(m)\backslash n\}) \prod_{n' \in N(m)\backslash n} q_{m,n'}(x_{n'}),$$

where the conditional probability in the summation is an indicator function that indicates whether the m-th check-sum is satisfied given the hypothesized values for $x_n$ and $\{X_{n'}\}$.

Step 2 (symbol-node update): For each n, and m ∈ M(n), and for x=0, 1, update $$q_{m,n}(x) = \mu_{m,n} P(x_n = x \mid y_n) \prod_{m' \in M(n)\backslash m} r_{m',n}(x),$$

where the constant $\mu_{m,n}$ is chosen such that $q_{m,n}(0) + q_{m,n}(1) = 1$.

For each n and for x=0, 1, update the "pseudoposterior probabilities" $q_n(.)$ as $$q_n(x) = \mu_n P(x_n = x \mid y_n) \prod_{m \in M(n)} r_{m,n}(x), \quad (6)$$

where the constant $\mu_n$ is chosen such that $q_n(0) + q_n(1) = 1$.

Step 3: (a) Quantize $\hat{x} = [\hat{x}_1, \ldots, \hat{x}_N]$ such that $\hat{x}_n = 1$ if $q_n(1) > 0.5$, and $\hat{x}_n = 0$ if $q_n(1) \leq 0.5$.

(b) If $\hat{x}H^T = 0$, then stop and $\hat{x}$ is the decoder output; otherwise go to Step 1.

(c) Declare a failure if the algorithm does not halt within some maximum number of iterations.

In a particular embodiment of the present invention, LLRs are employed as messages in place of APPs. This permits replacement of the multiplications in Step 2 of the SPA with additions. Step 3 can also be easily adapted for LLRs. Advantageously, LLRs can also be efficiently used in Step 1 without converting between LLRs and APPs.

Simplified Sum-Product Step Using Log-Likelihood Ratios

In general, each check-sum $pc_m(x)$ can be viewed as a single-parity check code on the k=|N(m)| symbols it checks. The node messages $r_{m,n}(x)$ of Step 1 can be regarded as extrinsic information for $x_n$ given the statistics $q_{m,n}(.)$. These messages can be computed by the forward-backward algorithm proposed by Mackay on the two-state trellis of the single-parity check code as follows (where ⊕ denotes addition modulo 2):

initialization of state metrics: $\alpha_0(0)=1$, $\alpha_0(1)=0$; $\beta_k(0)=1$, $\beta_k(1)=0$;

forward recursion: For i=1, ..., k−1 and x=0, 1

$$\alpha_i(x) = \alpha_{i-1}(0) q_{m,i}(x) + \alpha_{i-1}(1) q_{m,i}(x \oplus 1); \quad (7)$$

backward recursion: For i=(k−1), ..., 1 and x=0, 1

$$\beta_i(0) = \beta_{i+1}(0) q_{m,i+1}(x) + \beta_{i+1}(1) q_{m,i+1}(x \oplus 1);$$

combining recursion: For i=1, ..., k and x=0, 1

$$r_{m,i}(x) = \alpha_{i-1}(0) \beta_i(x) + \alpha_{i-1}(1) \beta_i(x \oplus 1).$$

In the LLR domain, let $$\delta A_i \triangleq \ln \frac{a_i(1)}{a_i(0)} \text{ and } \delta B_i \triangleq \ln \frac{\beta_i(1)}{\beta_i(0)}.$$

Note that the LLRs $\delta A_i$ and $\delta B_i$ can be viewed as the forward and backward difference metrics in the log domain. The application of a difference-metric approach to the dual-max detector for partial-response class IV channels is described in ÖLCER, S., and UNGERBOECK, G.: 'Reed-Muller coding for partial response channels'. 1993 *IEEE Int. Symp. on Information Theory*, San Antonio, Tex. (IEEE, Piscataway, 1992), p. 243. Consider the two-state parity-check trellis using the difference of state metrics, i.e., the difference of logarithms, which is merely the LLR of the probabilities. Consider also the following LLRs:

$$\lambda_{m,i} \triangleq \ln \frac{q_{m,i}(1)}{q_{m,i}(0)}$$

and $$\Lambda_{m,i} \triangleq \ln \frac{r_{m,i}(1)}{r_{m,i}(0)}.$$

Using the above definitions, the standard approximation $$\ln \sum_j \exp a_j \approx \max_j a_j$$

and the dual-max rule described in VITERBI, A. J.: 'An intuitive justification and a simplified implementation of the MAP decoder for convolutional codes', *IEEE J. Sel. Areas Commun.*, 1998, 16, (2), pp. 260–264, the forward recursion (7) can be rewritten as $$\delta A_i = \ln \frac{a_{i-1}(0) q_{m,i}(1) + a_{i-1}(1) q_{m,i}(0)}{a_{i-1}(0) q_{m,i}(0) + a_{i-1}(1) q_{m,i}(1)}$$

$$= \ln \{\exp(\lambda_{m,i}) + \exp(\delta A_{i-1})\} - \ln \{1 + \exp(\lambda_{m,i} + \delta A_{i-1})\} \quad (8)$$

$$\approx \max\{\lambda_{m,i}, \delta A_{i-1}\} - \max\{0, \lambda_{m,i} + \delta A_{i-1}\} \quad (9)$$

$$= \begin{cases} -sgn(\delta A_{i-1}) \lambda_{m,i} & \text{if } |\delta A_{i-1}| > |\lambda_{m,i}| \\ -sgn(\lambda_{m,i}) \delta A_{i-1} & \text{otherwise,} \end{cases}$$

where sgn(.) is the sign function.

The backward and the combining recursions can be reformulated in a similar way, which results in the following LLR version of the forward-backward algorithm:

initialization: $\delta A_0 = \infty$ and $\delta B_k = \infty$ forward recursion: For i=2 ... k−1

$$\delta A_i = \begin{cases} -sgn(\delta A_{i-1})\lambda_{m,i} & \text{if } |\delta A_{i-1}| > |\lambda_{m,i}| \\ -sgn(\lambda_{m,i})\delta A_{i-1} & \text{otherwise} \end{cases} \quad (10)$$

backward recursion: For i=k−1 . . . 1

$$\delta B_i = \begin{cases} -sgn(\delta B_{i+1})\lambda_{m,i+1} & \text{if } |\delta B_{i+1}| > |\lambda_{m,i+1}| \\ -sgn(\lambda_{m,i+1})\delta B_{i+1} & \text{otherwise} \end{cases} \quad (11)$$

combining recursion For i=1 . . . k $$\Lambda_i = \begin{cases} -sgn(\delta A_{i-1})\delta B_i & \text{if } |\delta A_{i-1}| > |\delta B_i| \\ -sgn(\delta B_i)\delta A_{i-1} & \text{otherwise} \end{cases} \quad (12)$$

Correction Factor for the Dual-Max Approximation:

The simplified SPA that results from using Equations (10) to (12) for the check node updates will be called the LLR-SPA because it operates entirely in the LLR domain. The LLR-SPA has a slightly lower performance than the full SPA. Following the aforementioned Viterbi reference, together with GROSS, W. J., and GULAK, P. G.: 'Simplified MAP algorithm suitable for implementation of turbo decoders', Electron. Lett., 1998, 34, (16), pp. 1577–1578, a correction factor can be applied to improve the dual-max approximation from Equations (8) and (9). Using the identity $$\ln\{\exp(x)+\exp(y)\}-\max\{x,y\}=\ln\{1+\exp(-|x-y|)\},$$

it can be shown that the approximation error, i.e., (8) minus (9), is given by the bivariate function $$f(u,v) = \ln\frac{1+\exp(-|u-v|)}{1+\exp(-|u+v|)},$$

where $u=,\delta A_{i-1}$ and $v=\lambda_{m,l}$. In practice, F(u,v) can be approximated by using a single correction factor c, i.e., $$f(u,v) \approx \begin{cases} c & \text{if } |u+v| > 2|u-v| \text{ and } |u-v| < 2 \\ -c & \text{if } |u-v| > 2|u+v| \text{ and } |u+v| < 2 \\ 0 & \text{otherwise.} \end{cases}$$

Figure 6:
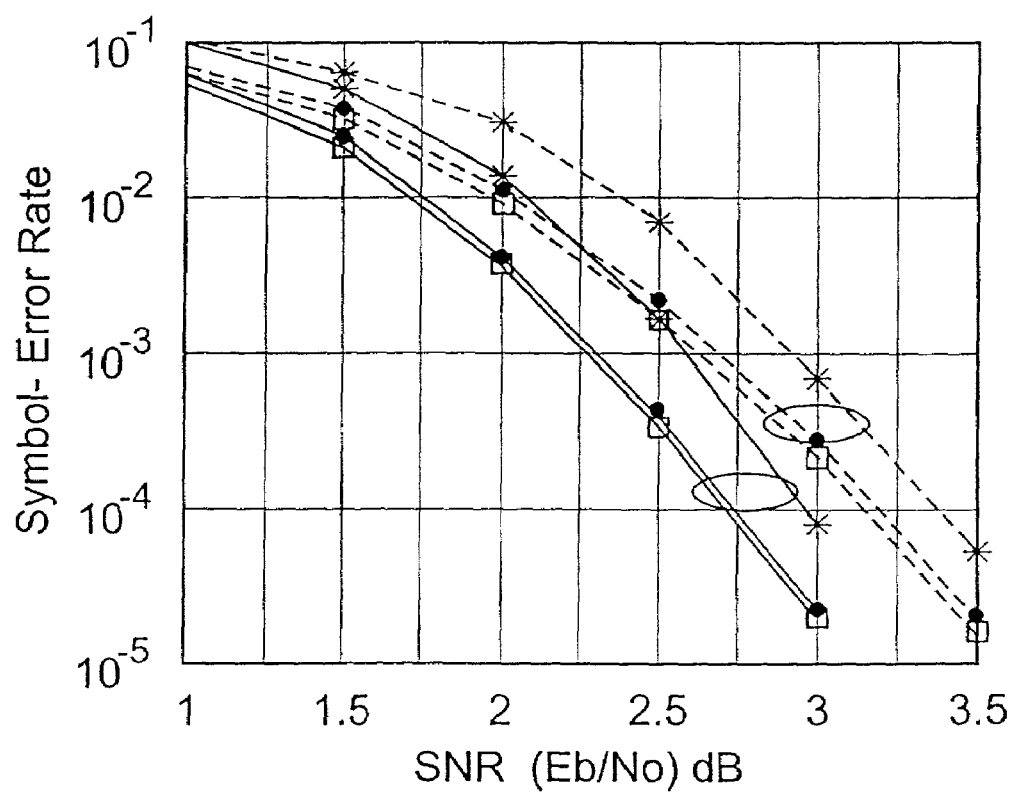

A similar correction factor applies to the approximations in the backward and combining recursions. The constant c can be selected to maximize the performance gains in the region of interest with respect to bit-error rate or signal-to-noise ratio. FIG. 6 shows the performance of the LLR-SPA with correction factor c=0.5 for an additive white Gaussian noise channel using the same rate-1/2 LDPC code with N=504 as in the aforementioned Fossorier reference. For comparison, the performance of the full SPA and LLR-SPA is also shown. The number of iterations for the two sets of curves shown is at most 10 and 200, respectively. It can be seen that LLR-SPA with correction factor performs within less than 0.05 dB of the full SPA.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for multilevel data communication comprising:

dividing a set of information bits to be transmitted into a first group and a second group;

encoding the first group to generate a block code;

selecting a subset of symbols in a constellation of symbols in dependence on the block code according to a Gray-coded mapping function;

selecting a symbol within the subset in dependence on the second group according to a Gray-coded mapping function; and transmitting the selected symbol, wherein the encoding comprises array coding the first group to generate an array code.

2. A method as claimed in claim 1, wherein the encoding comprised LDPC coding the first group to generate LDPC code.

3. A method as claimed in claim 1, wherein the first group comprises least significant bits of the set of information bits and the second group comprises most significant bits of the set of information bits.

4. A method as claimed in claim 1, wherein the first group comprises most significant bits of the set of information bits and the second group comprises least significant bits of the set of information bits.

5. A method as claimed in claim 1, further comprising receiving the selected symbol and recovering the set of information bits from the selected symbol.

6. A method as claimed in claim 5, wherein the recovering of the set of information bits comprises soft demapping the received symbol to generate a probability for each of the bits represented in the symbol to have a particular value and decoding the received symbol to recover the set of information bits in dependence on the probabilities generated by the soft demapping and the received symbol.

7. An apparatus for multilevel data communication, the apparatus comprising:
a divider for dividing a set of information bits to be transmitted into a first group and a second group;
a block encoder connected to the divider for encoding the first group to generate a block code; and,
a symbol mapper connected to the divider and the block encoder for selecting a subset of symbols in a constellation of symbols in dependence on the block code according to a Gray-coded mapping function, selecting a symbol within the subset in dependence on the second group according to a Gray-coded mapping function, and transmitting the selected symbol, further comprising a receiver for receiving the selected symbol and recovering the set of information bits from the selected symbol.

8. Apparatus as claimed in claim 7, wherein the encoder comprises an LDPC encoder for coding the first group to generate an LDPC code.

9. An apparatus as claimed in claim 7, wherein the encoding comprises array coding the first group to generate an array code.

10. Apparatus as claimed in claim 7, wherein the first group comprises least significant bits of the set of information bits and the second group comprises most significant bits of the set of information bits.

11. Apparatus as claimed in claim 7, wherein the first group comprises most significant bits of the set of information bits and the second group comprises least significant bits of the set of information bits.

12. Apparatus as claimed in claim 7, wherein the receiver comprises: a soft demapper for demapping the received symbol to generate a probability for each of the bits represented in the symbol to have a particular value and a decoder for decoding the received symbol to recover the set of information bits in dependence on the probabilities generated by the soft demapping and the received symbol.

13. A communications device comprising an information source for generating a set of information bits and apparatus for multilevel data transmission as claimed in claim 7 connected to the information source for transmitting the set of information bits.

14. An article of manufacture comprising a computer usable medium having computer readable program code means embodied therein for causing multilevel data communication the computer readable program code means in said article of manufacture comprising computer readable program code means for causing a computer to effect the steps of claim 1.

15. A program storage device readable by machine, tangibly embodying a program of instructions executable by the machine to perform method steps for multilevel data communication, said method steps comprising the steps of claim 1.

16. A computer program product comprising a computer usable medium having computer readable program code means embodied therein for causing multilevel data communication, the computer readable program code means in said computer program product comprising computer readable program code means for causing a computer to the effect the functions of claim 7.

* * * * *